//

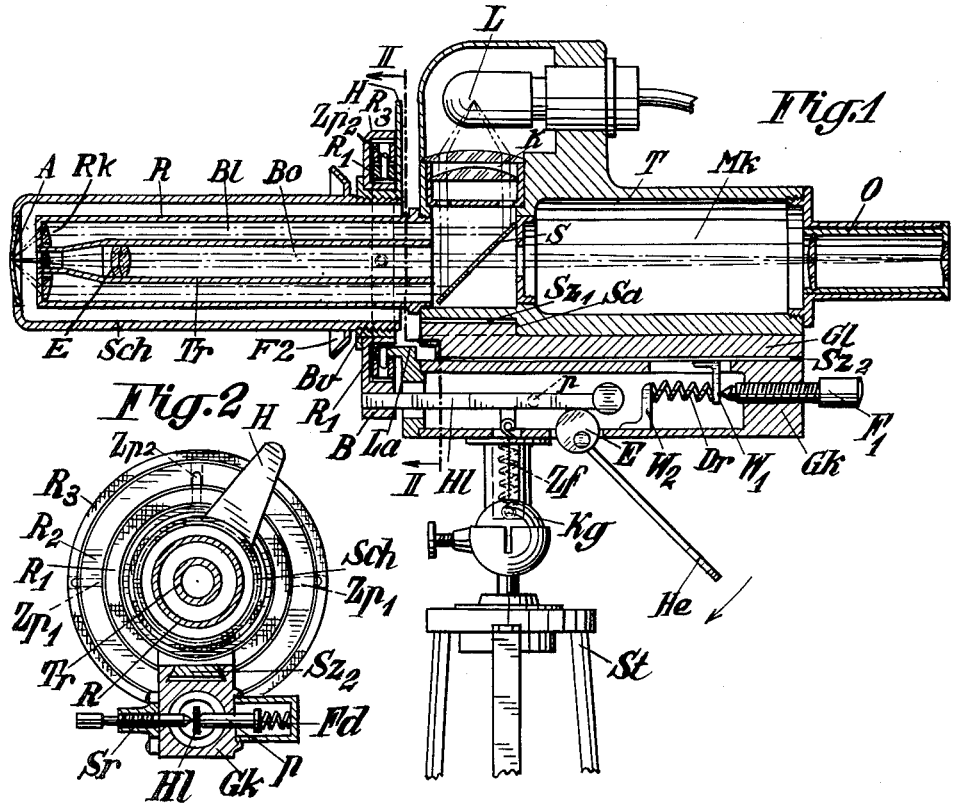

United States Patent Office 2,697,431
Patented Dec. 21, 1954

2,697,431

MICROSCOPE FOR DISTINGUISHING BETWEEN MALIGNANT AND SOUND CELLULAR TISSUE AT DIFFICULTLY ACCESSIBLE PARTS IN DEEP CAVITIES OF THE BODY

Tassilo Antoine, Viktor Grünberger, Gustav Kodal, Karl Wasner, and Adolf Kenzian, Vienna, Austria, assignors to Optische Werke C. Reichert, Vienna, Austria, a corporation of Austria Application October 10, 1950, Serial No. 189,416

Claims priority, application Austria June 15, 1949

9 Claims. (Cl. 128—6)

This invention relates to a microscope for distinguishing between sound and malignant cellular tissue at difficultly accessible portions in deep body cavities.

Examinations of living body cavities extending far into the body interior as, for example, the observation of the uterus, were heretofore carried out by the microscope at relatively low magnification (up to a maximum of 20). The microscope is disposed on the outside of the body, and the light is admitted by a source of light arranged laterally of the microscope and directed slantingly into the body cavity. The microscope objective must have a correspondingly long focal distance in order to enable the observation, and for this reason it can only permit a low magnification. At this low magnification only general broad images of the surface of the body cavity can be attained, and it is impossible to obtain information about the cell structure and about the cell cores in detail. The recognition of degenerated, malignant tissue which, e. g., admits of a cancer diagnosis, is thus only possible in especially favorable cases.

In order to remove this disadvantage, it has been proposed that a part of the microscope body including the image system and illumination system extending therein can be inserted into the body cavity. Thereby a corresponding closer approach of a short focal-length objective to the object (i. e., the bottom of the body cavity), and a sufficiently high magnification, may be obtained. The ray passage may preferably be executed as in the known exteriorly illuminated objectives with annular exterior illumination. The light coming from its source is concentrated by an annular condenser upon the object spot to be observed, while the imaging optical structure arranged within the annular condenser receives light diffusely reflected by the object. Furthermore, the microscope parts to be inserted into the body cavity, e. g., according to U. S. Patent 1,431,902 to Wolf, can be surrounded by a protective sleeve which on one hand permits the passage of light by being provided at its free end with a closure plate of glass or similar transparent material; on the other hand it is perfectly liquid proof. It is provided for two reasons: first, the inserted optical system must be safeguarded from getting dirty by bodily fluids or rinsing liquid; on the other hand, the closure plate of the protective sleeve serves to press against the soft, deformable body parts to be observed, in order to create an unequivocally defined surface for the observation.

The optical system of the microscope for observing inaccessible body cavities is distinguished from the conventional, directly-illuminated microscope insofar as the reflecting element which directs the light coming from the source (in a direction perpendicular to the microscope axis) into the microscope tube and onto the annular condenser already mentioned and surrounding the objective (e. g., the known elliptic ring mirror inclined at less than 45° to the tube axis), must be arranged at a relatively large distance from the objective owing to the considerable depth of insertion into the body cavity.

An object of the present invention is a microscope constructed according to the above principles, which with a view to attaining higher illumination intensities, bridges the large distance between the reflecting element and objective by one or several annular auxiliary lenses, leaving the middle tube portion free for the image ray passage.

In the above mentioned type of illumination utilizing the ring condenser, the light is supplied to the object at a very high angle of incidence. However, one can also use a type of illumination also conventional in the direct-light microscope art, the so-called interior illumination in which the objective simultaneously acts as a condenser. Thereby one attains an illumination of the object which is very favorable in many cases. According to the invention, with the interior illumination the axis of the illuminating ray passage can be arranged somewhat inclined to the axis of the image ray passage about the illuminating system, and somewhat laterally of the observation system. By this construction space for the image ray passage is left free and the occurrence of reflections is prevented.

A further construction of the subject matter of the invention relates to devices enabling a surveying of the object. A mere lateral adjustment of the entire microscope together with the protective sleeve would not lead to the aim in mind, since the object adhering to the closure plate is, upon a slight motion of this plate, taken along, and the same object spot would remain in the image field. According to the invention there is provided either a device to be manipulated from the exterior which moves the object relatively to the protective sleeve fixed to the microscope body, or the protective sleeve is movably mounted on the microscope body preferably by a Cardan joint, this motion of the protective sleeve progressing over the object adhering thereto. In the latter case the closure plate is spherical, the center of curvature lying at the Cardan joint center, so that the object always remains within the range of adjustment. In order to be able to swing the protective sleeve to a corresponding extent, a sufficient intervening space must be created between the protective sleeve and the tube surrounding the illuminating ray passage. Since the diameter of the protective sleeve is limited by the nature of the body cavity to be examined, the optical instrument for guiding the illuminating ray passage must be of as small a diameter as possible.

In order to be able to insert the optical system with ease, and especially painlessly, into the body cavity, and to correctly orient it, the microscope according to the invention can be composed of easily separable parts. Preferably these parts are: a base body which is mounted on a tripod and carries the moving means for adjusting the image; the microscope proper which includes the illuminating system and the image system; and finally the protective sleeve. The two last mentioned parts are secured to the base body independently of one another. This division of parts is of the greatest importance for practical work, first of all because thereby is avoided the necessity of working with a heavy and unhandy piece while inserting the implement into the body cavity to be examined, and of making adjusting motions. Painless insertion is thereby assured. Thus one inserts first the protective sleeve alone, then the base body clamped in suitable position on the tripod is positioned on the protective sleeve, and finally the microscope proper is fastened to the latter.

This sequence in assembling, moreover, affords the advantage that prior to securing the microscope proper one can still make an orienting observation with the unaided eye by looking into the protective tube and, if necessary, make a correction in the position of the implement. By the separation of the protective sleeve from the microscope proper it is furthermore possible to carry out the focusing (fine adjustment of the image) in such a way that with the protective sleeve stationary one moves the microscope proper on the base body axially by means of a conventional micrometer screw. A motion of the microscope together with the protective sleeve would not result in a fine adjustment because, as pointed out above, the object adheres to the closure plate of the protective sleeve and a small axial motion of the closure glass would result.

In the accompanying drawings,

Fig. 1 is a vertical sectional longitudinal view of a preferred form of the invention, Fig. 2 is a transverse sectional view taken on line II—II of Fig. 1, Fig. 3 is a side elevation of the protective tube of Fig. 1, Fig. 4 is a side elevation of the main microscope support of Fig. 1, and Fig. 5 is a side elevation of the microscope unit itself; Figs. 3 to 5 are arranged on the drawing as an exploded view of the Fig. 1 assembly.

In the arrangement shown in the drawings, and especially in Fig. 1 thereof, the path of the illuminating rays is kept separate from the path of the observation rays. The illuminating rays are designated $B_1$, and they travel to the left and are concentrated upon the field of inspection by the ring condenser $Rk$. The returning observation rays are focussed by the microscope objective E and thence pass to the microscope eyepiece. This separation of the rays provides adequate illumination even at the bottom of a body cavity, and when utilizing a short focal length objective such as is required for high magnifying powers.

The invention further illustrates a preferred mechanical construction which enables a device of this type to be used in inspecting any desired local portion of the field of view, by slight movements, in directions at right angles to one another, of the observational system with respect to tissues held in place against a window at the end of a protective sleeve within which the optical tubes are contained while within the body.

In the embodiment shown in Figs. 1 to 5, the microscope comprises the tube T with the eyepiece O, the annular mirror S, and the tube R for accommodating the paths of the illuminating rays produced by the collecting lens K. The inner diameter of the protective sleeve $Sch$ is greater than the outer diameter of the tube R so that the protective sleeve $Sch$ can be moved independently of R both horizontally and vertically and in intermediate directions, the protective sleeve being capable of being swivelled by a universal joint. For this purpose the protective sleeve is detachably fitted in the manner of a bayonet lock $Bv$ in the inner cylindrical wall of ring $R_3$ and can be locked by turning the closing lever H. During the locking movement, the protective sleeve (normally now inserted in a body cavity) does not turn so that the body portion to be examined is not deformed. A conical flange $F_2$ surrounds the protective sleeve $Sch$ near the point at which the sleeve enters the bayonet lock, to prevent the clamping of membranous folds during this operation. The ring $R_3$ is swivelled in the manner of a universal joint about the pins $Zp_1$ and $Zp_2$ in the rings $R_2$ and $R_1$. Thus this ring $R_3$ has two radial bores provided in it and angularly displaced with respect to one another by 180°, in which bores two pivot trunnions $Zp_1$ of ring $R_2$ engage, which thereby constitute a gimbal axis for ring $R_3$ about which axis the same together with the protective sleeve $Sch$ is movable. Ring $R_2$ also has two radial bores peripherally displaced with regard to its pivot trunnions $Zp_1$ by 90°, into which two pivot trunnions $Zp_2$ of ring $R_1$ are inserted, which define the second gimbal axis of the universal joint. Ring $R_1$ has a mounting arm $La$ by means of which it is rigidly secured to a base body $Gk$ which carries the entire microscope housing $Mk$. The microscope housing $Mk$ has at its lower surface a dove-tailed guide $Sz_1$ by means of which the housing is slidably mounted on the guide provided on base body $Gk$ as in Figs. 1, 4 and 5. The one part of the dovetail guide is mounted on the upper side of a sliding piece $G_1$, which has on its bottom surface another dovetail $Sz_2$, with which it is fitted into a corresponding groove in the base piece $Gk$.

At the lower dovetail $Sz_2$ of slide $G_1$ an angle bracket $W_1$ is fastened which extends into a space within base body $Gk$ in which is mounted an angle bracket $W_2$. Between the two brackets $W_1$ and $W_2$ a spring $Dr$ is arranged which abuts the two brackets $W_1$ and $W_2$ with a certain pre-tension and tends to move slide $G_1$ together with the microscope to an end position toward the right. The spring $Dr$ is opposed by a fine adjusting screw $F_1$ threadedly mounted in the face wall of base body $Gk$, the point of which screw presses against bracket $W_1$ of slide $G_1$. The dovetail guide $Sz_1$ of microscope housing $Mk$ has an end surface $Sa$ with which housing $Mk$ abuts in moving along the dovetail guide $Sz_1$ of slide $G_1$, whereby simultaneously the rough or coarse adjustment of the microscope with regard to the objective surface is achieved.

Then in order to be able to move the protective sleeve $Sch$ by means of the universal joint in all directions, and also to maintain it in the respective adjusted position, there is provided on ring $R_3$ an extension B in which is fastened an end of lever arm $Hl$, which lever extends into the hollow space of base body $Gk$ in substantially horizontal position and is maintained in this position by a tension spring $Zf$ secured at its other end in the hollow spherical head $Kg$ of a ball-and-socket support joint, the spring thus acting in opposition to the weight of the protective sleeve $Sch$. At right angles to the lever arm $Hl$ in base body $Gk$ is an axially movable pin $p$, subjected to the pressure of a spring $Fd$ and abutting one surface of the lever, the other surface being engaged by an adjusting screw $Sr$ which acts in opposition to pin $p$. By means of this adjusting screw $Sr$ lever arm $Hl$ can be swung, together with the protective sleeve $Sch$ in opposition to the pin spring $Fd$ about the universal joint $R_1$—$R_3$ in the horizontal plane. Beneath lever arm $Hl$, near the free end thereof, an eccentric E is rotatably mounted in base body $Gk$, which eccentric E may be rotated by means of a lever $He$, and one point of its periphery always abuts the lower side of lever arm $Hl$. By this eccentric E lever $Hl$ can be lifted or lowered in opposition to spring $Zf$, whereby the protective sleeve $Sch$ is swingable in the vertical plane about the universal joint. Hence, each point of the area covered by the front end of the protective sleeve can be scanned. The protective sleeve $Sch$, performing a swivelling movement about the center of the universal joint, is closed at its front end by a spherically curved glass A, the curvature of which has its center at the center of the universal joint, so that the object remains at the distance adjusted.

In order to provide the difference between the diameters of the protective sleeve $Sch$ and the tube surrounding the paths of the illuminating rays, which difference enables this sufficient mobility, that is, in order to make the tube R as narrow as possible, the illuminating rays, for which no complicated intermediate systems are provided, are mechanically separated from the observation rays by the blackened separating tube $Tr$. It has been found that this mechanical separation of the illuminating from the observation rays by means of a separating tube, while less expensive, is optically at least equivalent.

Fig. 3 shows the protective sleeve $Sch$, Fig. 4 the base piece $Gk$, and Fig. 5 the microscope proper $Mk$, independent of each other. To enable the fine adjustment of the microscope clamped in the dovetail $Szl$, the latter is movable by the screw $F_1$, which is capable of displacing the dovetailed groove against the force of the compression spring $Dr$. The ball $Kg$ serves in the known manner for articulating the entire apparatus on a standard $St$ for movement in all directions.

What we claim is:

1. A microscope for examining the interiors of bodies, such as body cavities, comprising a main body portion containing an observing eyepiece and a source of illumination, a combined objective and light-conductive tube extending from said main body portion with its optical axis in alignment with said eyepiece, said tube extending forwardly from said main body portion a distance which is large compared with its diameter, a microscope objective mounted adjacent the extreme end of said tube, means including at least one lens element in said tube for directing illumination from said source along said tube to illuminate an area to be examined, a sealed protective sleeve surrounding said tube and extending beyond its remote end, a universal joint connecting said sleeve to said main body portion permitting a lateral swinging movement of said sleeve to move an object adhering to said window relative to the optical system, and a transparent sealed observation window at the end of said sleeve to enable illumination and viewing of the area under examination, said eyepiece being positioned for collecting image rays returning from said objective to image said area.

2. A microscope in accordance with claim 1, including means on said main body portion for swinging said sleeve in mutually perpendicular directions.

3. A microscope in accordance with claim 1, including a protective flange on said tube at the end thereof adjacent said universal joint.

4. A microscope in accordance with claim 1, including a quick-detachable connection between said sleeve and said universal joint.

5. A microscope in accordance with claim 1, in which said universal joint consists of three nested rings of which each adjacent pair are pivoted to one another on an axis perpendicular to that connecting the other pair.

6. A microscope in accordance with claim 1, including a supporting base on which said universal joint and said sleeve are mounted, and a detachable connection between said base and said main body portion.

7. A microscope in accordance with claim 6, in which said detachable connection comprises a dovetail slide permitting axial movement of said main body portion along said supporting base, and abutments on said body portion and said slide for determining a position of approximate focus of said microscope.

8. A microscope in accordance with claim 7, including adjustable means on said base engaging a part of said slide for fine adjustment of said slide in the axial direction.

9. A microscope in accordance with claim 7, including a member connected to said sleeve, screw means on said base for engaging said member and swinging said sleeve in one direction, and pivoted lever means on said base for engaging said member and swinging the sleeve in the perpendicular direction.

References Cited in the file of this patent

UNITED STATES PATENTS

| Number | Name | Date |
| --- | --- | --- |
| 1,431,902 | Wolf | Oct. 10, 1922 |
| 1,735,949 | Brady | Nov. 19, 1929 |
| 2,059,781 | Ellestad | Nov. 3, 1936 |
| 2,097,762 | Heine | Nov. 2, 1937 |
| 2,103,230 | Benford et al. | Dec. 28, 1937 |
| 2,138,665 | Ott | Nov. 29, 1938 |
| 2,357,378 | Benford | Sept. 5, 1944 |
| 2,471,879 | Lowber et al. | May 31, 1949 |

FOREIGN PATENTS

| Number | Country | Date |
| --- | --- | --- |
| 483,158 | Germany | Sept. 30, 1929 |